United States Patent
Woods et al.

(10) Patent No.: US 7,354,977 B1
(45) Date of Patent: Apr. 8, 2008

(54) PROCESS FOR HYDROXYALKYLATING CARBOXYLIC ACID-FUNCTIONALIZED MATERIALS

(75) Inventors: John G. Woods, Farmington, CT (US); Susanne D. Morrill, West Hartford, CT (US); Anthony F. Jacobine, Meriden, CT (US)

(73) Assignee: Henkel Corporation, Rocky Hill, CT (US)

( * ) Notice: Subject to any disclaimer, the term of this patent is extended or adjusted under 35 U.S.C. 154(b) by 0 days.

(21) Appl. No.: 09/341,287

(22) PCT Filed: Jan. 16, 1998

(86) PCT No.: PCT/US98/00862

§ 371 (c)(1),
(2), (4) Date: Aug. 19, 1999

(87) PCT Pub. No.: WO98/31655

PCT Pub. Date: Jul. 23, 1998

(51) Int. Cl.
*C08F 8/12* (2006.01)

(52) U.S. Cl. ............ 525/383; 525/327.4; 525/329.1; 525/329.2; 525/329.3; 525/331.9

(58) Field of Classification Search ............ 525/329.3, 525/329.2, 383, 329.1, 327.4, 331.9; 560/198, 560/200
See application file for complete search history.

(56) References Cited

U.S. PATENT DOCUMENTS

| | | | |
|---|---|---|---|
| 2,448,767 A | 9/1948 | Carlson | 260/284 |
| 3,285,949 A | 11/1966 | Slebert | 260/465.4 |
| 3,346,631 A | 10/1967 | Boyer | 260/523 |
| 3,551,472 A | 12/1970 | Slebert | 260/465.4 |
| 4,261,922 A | 4/1981 | Kem | 260/512 R |
| 4,266,046 A | 5/1981 | Wu | 528/309 |
| 4,295,909 A | 10/1981 | Baccei | 156/307.3 |
| 4,310,707 A | 1/1982 | Strege | 568/648 |
| 4,444,692 A | 4/1984 | Okamoto | 260/465.4 |
| 4,474,951 A | 10/1984 | Pope | 536/95 |
| 4,489,008 A | 12/1984 | Riew | 260/465.4 |
| 4,513,146 A | 4/1985 | Thompson | 560/231 |
| 4,521,585 A * | 6/1985 | Thomsen et al. | 528/271 |
| 5,019,629 A | 5/1991 | Woods et al. | 525/312 |
| 5,371,181 A | 12/1994 | Glaser et al. | 528/376 |
| 5,399,624 A | 3/1995 | Glaser et al. | 525/289 |

OTHER PUBLICATIONS

The Merck Index, 11th ed., Merck & Co., Inc., Rahway, NJ, p. 3759 (1989).*
"Catalog Handbook of Fine Chemicals" Aldrich Chemical Company, Milwaukee, WI pp. 664 and 668 (1994-95).*
T. Yoshino, "Synthetic Studies with Carbonates. Part 6. Syntheses of 2-Hydroxyethyl Derivatives by Reactions of Ethylene Carbonate with Carboxylic Acids or Heterocycles in the Presence of Tetraethylammonium Halides or Under Autocatalytic Conditions", *J. Chem. Soc., Perkins Trans I.*, 11, 1266-72 (1977).

* cited by examiner

Primary Examiner—Bernard Lipman
(74) Attorney, Agent, or Firm—Steven C. Bauman

(57) ABSTRACT

The present invention relates to a process for hydroxyalkylating terminal carboxylic acid groups. More specifically, this invention provides a process for preparing hydroxyl-functionalized materials, such as butadiene nitrile polymers, from carboxylic acid-functionalized materials, such as butadiene nitrile polymers, using a carbocyclic carbonate, such as ethylene carbonate, or a carbocyclic sulfite, such as ethylene sulfite.

15 Claims, No Drawings

PROCESS FOR HYDROXYALKYLATING CARBOXYLIC ACID-FUNCTIONALIZED MATERIALS

BACKGROUND OF THE INVENTION

Field of the Invention

The present invention relates broadly to a process for hydroxyalkylating carboxylic acid-functionalized materials. More specifically, this invention provides a process for preparing primary hydroxyl-terminated polymers from carboxylic acid-terminated polymers, such as carboxylic acid-terminated butadiene nitrile co-polymers ("CTBNs"), using a carbocyclic carbonate, such as ethylene carbonate, or a carbocyclic sulfite, such as ethylene sulfite.

BRIEF DESCRIPTION OF THE PRIOR ART

Hydroxyl-terminated butadiene nitrile co-polymers ("HTBNs") are known, and are generally useful as extenders with difunctional polymerizable materials to add toughness to adhesive compounds, caulking compounds and potting compounds. HTBNs react rapidly through their terminal hydroxyl groups with, for instance, organic diisocyanates to form solid, high molecular weight materials of low fusibility. [See e.g., U.S. Pat. No. 3,551,472 (Siebert).] They are also used in particular to form block prepolymer resins, as taught by U.S. Pat. No. 4,295,909 (Baccei), the disclosure of which is hereby incorporated herein by reference.

Certain HTBNs, such as one available under the tradename "HYCAR" 1300X29, have been manufactured commercially for some time by the B.F. Goodrich Co., Akron, Ohio. To that end, B.F. Goodrich's U.S. Pat. No. 4,444,692 (Okamoto) claims a process for making such HTBNs from carboxylic acid-terminated butadiene nitriles ("CTBNs") using ethylene oxide. In fact, this process is believed to have been used to manufacture commercial quantities of HTBNs. Ethylene oxide, however, is a gaseous and hazardous material which is highly toxic and thus, at least for this reason, is undesirable as a reactant. Accordingly, different processes, particularly ones which did not employ the gaseous and highly toxic ethylene oxide and which achieve the desired result, would be viewed as desirable.

Another method of preparing HTBNs from CTBNs involves the use of diols. Indeed, B.F. Goodrich's '472 patent discloses such a method, employing diols having three to six carbon atoms in an acid-catalyzed direct esterification to yield primary hydroxyl-terminated materials with a straight-chain three to six carbon atom unit between the carboxylic acid linkage and the hydroxyl terminus. However, this process has certain undesirable features, namely the use of a large excess of the diol which is particularly troublesome to remove upon completion of the reaction, and trans-esterification which results in an increase of the molecular weight of the so-formed HTBN which in turn increases the viscosity and reduces the hydroxyl number of the resultant HTBN.

Hydroxyamide-terminated equivalents to HTBN have also been prepared by amidation of CTBN with aminoalcohols. See B.F. Goodrich's U.S. Pat. No. 4,489,008 (Riew). However, such process is not particularly suitable for large-scale commercial production as aminoalcohols are not only toxic, but are used in molar excess to CTBN. Since residual aminoalcohols are difficult to remove, the final polymer is frequently treated with maleate esters and the like to ensure complete aminoalcohol removal. This results in the formation of low molecular weight reactive plasticizers, which adversely affect the toughness of urethane resins produced from the so-prepared hydroxyamide-terminated material.

Methods of introducing an alkyl hydroxyl functional group in place of an acidic hydrogen, such as from a carboxylic acid or a phenol, are known, an example of which involves the use of ethylene carbonate together with basic materials such as potassium carbonate and the like. See U.S. Pat. No. 5,019,629 (Woods). However, use of potassium carbonate in the realm of the conversion desired herein fails to yield desired HTBN. Also, U.S. Pat. No. 2,448,767 (Carlson) speaks to the hydroxyethylation of certain compounds including carboxylic acids generally using ethylene carbonate or ethylene sulfite, either in the absence of a catalyst or in the presence of an acidic one like sulfuric acid or organic esters thereof, or an alkali carbonate. However, use of either no catalyst or an acidic one in the realm of the conversion desired herein also fails to yield desired HTBN.

Other methods for hydroxyalkylating materials, such as polysaccharides, are known. For instance, U.S. Pat. No. 4,474,951 (Pope) speaks to and claims the hydroxyalkylation of polysaccharides using an alkylene carbonate in the presence of a catatytic amount of a quartnery ammonium halide.

In addition, U.S. Pat. No. 4,513,146 (Thompson) speaks to the use of carbonates to form esters of carboxylic acids. The '146 patent is silent, however, as to cyclic carbonates for such use.

U.S. Pat. No. 4,310,707 (Strege), however, speaks to and claims a method of hydroxyalkylating phenols and thiophenols using cyclic organic carbonate compounds and sodium stannate as the catalyst. U.S. Pat. No. 4,261,922 (Kem) also relates to hydroxyl alkylation reactions to prepare ether compounds from cyclic organic carbonate compounds and phenols contacted in the presence of potassium iodide catalyst. And U.S. Pat. No. 4,266,046 (Wu) speaks to and claims a process for preparing esters of polycarboxylic acids which includes reacting cyclic carbonates with a polycarboxylic acid in the presence of an alkylammonium halide. The polycarbocyclic acids are exemplified as hydrocarbon radicals having from two to four carboxylic acid groups, and are selected from substituted aromatic acids, cyclohexyl acids and short chain acids.

In the context of low molar mass compounds, see Yoshino, *J. Chem. Soc., Perkins Trans. I*, (11) 1266 (1977).

Nevertheless, it would be desirable to demonstrate yet another way in which an hydroxyl group could be introduced to a carboxylic acid group, particularly in the case of the preparation of HTBNs (such as HTBNs having a lower alkyl, e.g., a two or three carbon unit, between the carboxylic acid functionality and the hydroxyl group), which does not involve the use of the hazardous reagent, ethylene oxide, to achieve the desired result.

SUMMARY OF INVENTION

The present invention is directed to a process for hydroxyalkylating carboxylic acid group-functionalized material. More specifically, this invention provides a process for preparing an hydroxyl-functionalized material, which includes the step of reacting a carboxylic acid-functionalized material with an amount of a carbocyclic carbonate or carbocyclic sulfite in the presence of a phase transfer catalyst under conditions sufficient to form the hydroxyl-functionalized material. In a particularly desirable aspect of the invention, the functionalized material should be a nitrile rubber, such as those found in a liquid or melt phase. The amount of carbocyclic carbonate or carbocyclic sulfite should of course be sufficient to convert the carboxylic acid groups of the carboxylic acid-functionalized material into an hydroxyl-functionalized material.

By the process of the present invention, therefore, a carboxylic acid-functionalized material is converted into an hydroxyl-functionalized material having a lower alkyl linkage (such as a two or three carbon alkyl linkage) between the prior carboxylic acid group (now an ester linkage) and the newly-formed hydroxyl group.

Also, more generally, the present invention provides a method of using carbocyclic carbonates or carbocyclic sulfites, such as ethylene carbonate or propylene carbonate (such as 1,3-propylene carbonate), or ethylene sulfite or propylene sulfite (such as 1,3-propylene sulfite), respectively, in the presence of a phase transfer catalyst as a replacement reactant in synthetic schemes presently calling for the use of carbocyclic oxides, such as ethylene oxide or propylene oxide, respectively. In such use, the carbocyclic carbonates or carbocyclic sulfites are capable of introducing an alkyl hydroxyl group to a reactive group having an acidic hydrogen, such as a carboxylic acid group.

The present invention also provides a method of purifying the so-formed hydroxylated material which includes the step of contacting the reaction mixture with an appropriate amount of an amphoteric treating agent. This purifying treatment method avoids the conventional use of a solvent to accomplish that objective.

The process of the present invention treats a carboxylic acid-functionalized material, such as CTBN, with an hydroxyalkylating reagent, such as a carbocyclic carbonate or carbocyclic sulfite, in the presence of a phase transfer catalyst to provide a corresponding hydroxyl-functionalized material, such as HTBN, in a manner which is simple, safe and commercially viable. As an unexpected result, in the case of HTBN, the so-formed HTBN demonstrates certain properties unlike those of conventionally prepared HTBNs, which may be attributable to the lack of ethylene glycol in the HTBN, see infra. The lack, or substantial lack, of such impurity results in improved performance for certain applications compared to HTBN derived from conventional processes (e.g., using ethylene oxide). For instance, urethane block co-polymers may be prepared therefrom with improved toughness.

In the process according to the present invention, the hydroxyalkylating reagent, as well as the phase transfer catalyst, are non-toxic and require neither special handling conditions nor equipment. The process according to this invention also does not require a solvent for reaction and in one aspect does not require a solvent for separation or purification. In addition, at least the prior process which employs ethylene oxide also requires a trialkyl amine catalyst, the entire removal of which at the completion of the reaction is difficult and the presence of which (even in residual amounts) frequently results in premature polymerization of block resins formed from HTBN.

The present invention will be more readily appreciated by those of skill in the art after a reading of the detailed description of the invention which follows, together with the illustrative examples presented thereafter.

DETAILED DESCRIPTION OF THE INVENTION

As noted above, this invention relates to a process for reacting carboxylic acid-functionalized polymeric materials, such as terminal and/or pendant carboxylic acid-functionalized materials, with an amount of carbocyclic carbonate or carbocyclic sulfite, such as ethylene carbonate or ethylene sulfite, respectively, sufficient to cause formation of hydroxyl-functionalized materials by conversion of carboxylic acid groups to hydroxyl groups with a lower alkyl linkage between the ester linkage and the newly-formed hydroxyl group.

The hydroxyalkylating reagent appropriate to convert terminal carboxylic acid groups to corresponding terminal hydroxyl groups may be chosen from a variety of materials. Of particular interest are carbocyclic carbonates and carbocyclic sulfites. For instance, where a primary hydroxyl is desirable as a terminal group, an unsubstituted carboxylic material may be chosen. That is, in the event a two or a linear three carbon linkage is desired between the ester linkage and the terminal hydroxyl group, and carbocyclic carbonate is desired as the hydroxyalkylating reagent, ethylene carbonate or 1,3-propylene carbonate should be used. Where a mixture of primary and secondary hydroxyl groups is desired as the terminal groups and carbocyclic carbonates are desired as hydroxyalkylating reagent, 2-methyl-1,2-ethylene carbonate or 3-methyl-1,3-propylene carbonate should be used. If secondary hydroxyl groups alone are desired, then 1,2-dimethyl-1,2-ethylene carbonate or 1,3-dimethyl-1,3-propylene carbonate should be used. Similarly, 1,1-dimethyl-1,2-ethylene carbonate or 1,1-dimethyl-1,3-propylene carbonate should yield a mixture of primary and tertiary hydroxyl end groups; 1,1,2-trimethyl-1,2-ethylene carbonate or 1,1,2-trimethyl-1,3-propylene carbonate should yield a mixture of secondary and tertiary hydroxyl end groups; and 1,1,2,2-tetramethyl-1,2-ethylene glycol or 1,1,2,2-tetramethyl-1,3-propylene glycol should yield tertiary hydroxyl end groups.

As for carbocyclic sulfites, ethylene sulfite and propylene sulfites (such as 1,2-propylene sulfite and 1,3-propylene sulfite) should be used. Of course, combinations of carbocyclic carbonates and carbocyclic sulfites may also be used.

Generally, a stoichiometric or a slight excess amount of the carbocyclic carbonate or carbocyclic sulfite may be used for each equivalent of carboxylic acid group present on the carboxylic acid-functionalized material. Desirably, in the case of a carbocyclic carbonate, a slight excess may be used, such as about 2.2 equivalents for each equivalent of carboxylic acid-functionalized material having two carboxylic acid groups.

As noted above, the reaction desirably proceeds in the presence of a phase transfer catalyst. The catalyst may be any material capable of accelerating the rate of hydroxyalkylation and minimizing undesirable side reactions. Ordinarily, the catalyst is a quaternary ammonium halide and may be used in an amount in the range of about 0.005 to about 0.5 equivalents, with about 0.01 to about 0.1 equivalents being preferred, for each equivalent of the carboxylic acid-functionalized material. Phosphonium halides (such as triphenyl phosphonium halides like triphenyl phosphonium bromide) and sulfonium halides may also be used. See e.g., the '046 patent, the disclosure of which is hereby expressly incorporated herein by reference.

Specific examples of suitable quaternary ammonium halides include alkaryl ammonium halides, such as benzyltrimethyl ammonium chloride and tetralkyl ammonium halides, such as tetraethyl ammonium halides or tetrabutyl ammonium halides like bromides or iodides. Other desirable materials useful as the phase transfer catalyst include crown ethers and calixarenes. Of course, combinations of these materials may also be used. A particularly desirable catalyst in connection with the process of the present invention is tetraethylammonium iodide.

The carboxylic acid-functionalized materials used in the process of the present invention may be selected from a wide variety of carboxylic acid-functionalized polymers having mono- or poly-carboxylic acid groups. Included among such materials are alkenoic carboxylic acid-functionalized materials, polymers of dienes, such as butadiene, co-polymers of dienes and vinylnitriles, such as butadiene-acrylonitrile, and alkyl acrylates, which may be prepared, for example, by known processes, such as described in B.F. Goodrich's U.S. Pat. No. 3,285,949 (Siebert), and the like.

Other suitable materials include carboxylic acid-functionalized versions of liquid and solid polymers of conjugated diene monomers or mixtures of these monomers with co-polymerizable monomers. Examples include olefins (e.g., isobutylene), aryl olefins and substituted aryl olefins (e.g., styrene, p-chlorostyrene, p-methoxystyrene, alpha methyl styrene, vinyl naphthalene, and the like); unsaturated organic acids (e.g., acrylic and methacrylic acids); alkyl esters of acrylic and methacrylic acids (e.g., methyl acrylate, methyl methacrylate, butylacrylate, and the like); nitriles of acrylic and methacrylic acids (e.g., acrylonitrile, methacrylonitrile, and the like); vinylidene chloride; vinyl ketones (e.g., methyl vinyl ketones); vinyl ethers; vinyl carbazole; vinyl furan; vinyl pyridine; and the like. These liquid or solid polymers may be prepared by conventional methods including mass, emulsion and solution polymerization methods. See U.S. Pat. No. 3,346,631 (Boyer), the disclosure of which is hereby expressly incorporated herein by reference.

A general representation of certain desirable carboxylic acid-functionalized polymers suitable for use with the subject invention include those within structure:

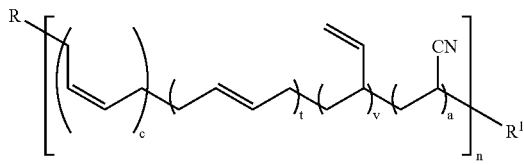

where R and $R^1$ may be the same or different and may be selected from COOH or $CAA^1$—X—COOH, where A and $A^1$ may be the same or different and may be selected from hydrogen, halogen, cyano, or linear or branched alkyl groups having from 1 to about 5 carbon atoms and X may be selected from linear or branched alkyl groups having from 2 to about 5 carbon atoms, such as methylene, ethylene, propylene and the like.

The fraction of repeat units of the contributing repeat fragment are represented, by c+t+v+a=1, and n represents the average degree of polymerization.

Examples of carboxylic-acid functionalization through the CAA'—X—COOH group include

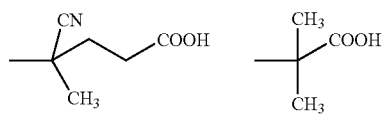

Specific examples of carboxylic acid-functionalized polymers which may benefit from the process of the present invention include acrylic and methacrylic acid polymers and co-polymers, carboxylic acid-functionalized hydrogenated butadiene nitrile co-polymers, carboxylic acid-terminated poly(isobutylene), carboxylic acid-terminated polyesters, polyamides, polyurethanes and polymeric acids derived from maleic anhydride co-polymers, and carboxylic acid-terminated polyethylene, polybutadiene, polyisoprene, poly (butadiene-co-acrylonitrile), poly(isobutylene), poly(butadiene-co-styrene), poly(butadiene-co-acrylonitrile-co-acrylic acid), poly(ethyl acrylate), poly(ethyl acrylate-co-n-butyl acrylate), poly(n-butyl acrylate-co-acrylonitrile), poly(butyl acrylate-co-styrene), and the like. Of course, carboxylic acid-functionalized block and graft co-polymers may also be hydroxyalklated according to the present invention.

Of particular interest is CTBN, available commercially from B.F. Goodrich under the "HYCAR" trademark, such as "HYCAR" 1300X31. CTBN generally has a number average molecular weight in the range of about 3,100 to about 4,200, with about 3,800 being desirable, an AN content in the range of 0 to about 26% by weight, with about 10% being desirable (polymer without AN in the case of CTBN, is carboxy-terminated polybutadiene (CTB)], and terminal groups R and $R^1$ as shown above. With respect to contributing repeat unit fragments, CTBN has c+t+v=1−a, where generally a=0.1, and n is in the range of about 5 to about 750, with about 53 to about 74 being desirable.

Typically, the process of the present invention may be performed by contacting together the carboxylic acid-functionalized polymer, such as CTBN, a carbocyclic carbonate, such as ethylene carbonate, and a phase transfer catalyst, such as tetrabutyl ammonium iodide, for a period of time in the range of about 0.5 hours to about 2 hours, with about 1 hour being desirable, at a temperature in the range of about 125 to about 150° C. Of course, variations of these time and temperature parameters may be desirable depending on the identity and quantity of the starting materials used. Such variations are routine and within the ambit of knowledge of those persons of skill in the art.

The so-formed hydroxyl-functionalized polymer, such as HTBN, may thereafter be used, if desired, as generated directly from the reaction mixture, or coagulated with liquid media, such as methanol and/or water, physically separated, such as by decantation, and dried under vacuum. Alternatively, the so-formed hydroxyl-functionalized material may be treated with an amphoteric treating agent, as discussed infra, followed by physical separation, such as filtration.

It may be desirable to alter the reaction conditions in order to suit the particular reagents chosen. For example, while a liquid medium, such as a solvent, ordinarily is not required to perform the process of this invention, one may be desirable if, for instance, the carboxylic acid-functionalized polymer chosen is solid at the reaction temperature or if the hydroxyalkylating reagent is insoluble in the carboxylic acid-functionalized polymer at that temperature. Appropriate solvents or liquid media capable of dissolving or dispersing the carboxylic acid-functionalized polymer and the hydroxyl-functionalized polymer formed therefrom include acetone, methyl ethyl ketone, cyclohexanone, tetrahydrofuran, dioxane, toluene, xylene(s) and combinations thereof. Ordinarily, however, the hydroxyalkylating reagent, such as carbocyclic carbonate, may be used in an excess amount to ensure fluidity and accomplish satisfactory heat transfer. Those persons of skill in the art should of course make appropriate choices for the liquid media, when used, to achieve the desired results.

The hydroxyl-functionalized polymers produced by the process of the present invention include, of course, hydroxyalkylated versions of any of the wide variety of carboxylic acid-functionalized polymers indicated above. For instance, hydroxyalkylated versions of the carboxylic acid-functionalized polymer include those where R and $R^1$ may be selected from COO—$X^1$—OH or $CAA^1$—X—COO—$X^1$—OH, where A, $A^1$ and X are as defined above and $X^1$ is as defined by X.

Examples of hydroxyalkylated versions of carboxylic acid-functionalized polymers through the COO—$X^1$—OH or the $CAA^1$—X—COO—$X^1$—OH group therefore include

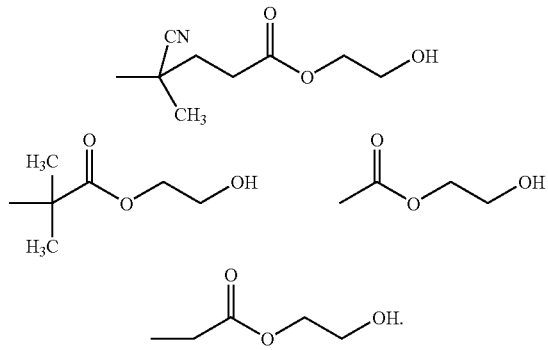

Specific examples of hydroxyl-functionalized polymers which may be prepared in accordance with the process of the present invention include hydroxyl-terminated polyethylene, polybutadiene, polyisoprene, poly(butadiene-co-acrylonitrile), poly(butadiene-co-styrene), poly(butadiene-co-acrylonitrile-co-acrylic acid), poly(ethyl acrylate), poly(ethyl acrylate-co-n-butyl acrylate), poly(n-butyl acrylate-co-acrylonitrile), poly(butyl acrylate-co-styrene), and the like.

Specific examples of hydroxyl-functionalized copolymers of butadiene containing in excess of about 50% by weight of butadiene with the remainder being at least one co-polymerizable olefinically unsaturated monomer, such as acrylonitrile, alkyl acrylates and methacrylates, acrylic and methacrylic acid, and other materials known to free-radically co-polymerize with butadiene, such as styrene(s) and derivatives thereof, and other related polymerizable materials, such as are disclosed, for instance, in the '909 patent.

After the hydroxyl-functionalized polymers are formed, they are separated from the reaction mixture by precipitation in a suitable non-solvent, such as methanol. This provides purified polymer free of a phase transfer catalyst, ethylene carbonate and ethylene glycol (if ethylene carbonate is used as the carbocyclic carbonate), after removal of solvent. The so-formed polymer may also be purified through contact with an amphoteric treating agent, which removes all or substantially all of the catalyst. Such amphoteric treating agents and general uses therefor are discussed in detail in U.S. Pat. No. 5,371,181 (Glaser) and U.S. Pat. No. 5,399,624 (Glaser).

The amphoteric treating agents so noted may be chosen from silicated magnesium oxide, magnesium oxide, magnesium hydroxide, calcium hydroxide, barium oxide and barium hydroxide. Of course, combinations thereof may also be employed, if desired. The average particle size of the amphoteric treating agent should be in the range of about 2 to about 200 microns. A particularly desirable amphoteric treating agent is "MAGNESOL" Polysorb 30/40 hydrated silicated magnesium oxide (commercially available from The Dallas Group of America Inc., Liberty Corner, N.J.), which has a particle size in the range of from about 2 to about 200 microns, and an average particle size of about 50 microns.

The use of such amphoteric treating agents allows for adsorption of the catalyst from the reaction mixture and avoids the introduction of a solvent, such as methanol, which must thereafter be removed, and which is flammable. After treatment, the amphoteric treating agents may be removed by physical means, such as filtration. The desirability of using the amphoteric treating agents is therefore seen not only as a purification measure, but also as a safety measure, as well as a cost-saving measure.

Accordingly, it is seen that a number of significant advantages may be realized by the process of the present invention, particularly when compared with known processes. For instance, a relatively innocuous coreactant is employed in the process hereof (i.e., a carbocyclic carbonate, such as ethylene carbonate, or a carbocyclic sulfite, such as ethylene sulfite) as compared with the coreactant used in certain known processes (i.e., ethylene oxide). Another significant advantage is that fewer impurities are formed through the use of a carbocyclic carbonate or carbocyclic sulfite reagent, and impurities originating from ethylene oxide or the amine catalyst used therewith are no longer present.

What's more, while removal of the amine catalyst in prior processes was also seen as important for promoting shelf-stability of hydroxyl-terminated polymers (see e.g., the '692 patent) and stabilizing formulations containing hydroxyl-terminated polymers and acrylate diluents (such as through the observation of less gelling of the diluent component) used for making block resins (see e.g., the '909 patent), use of an acidic material to accomplish that objective was viewed as disadvantageous, particularly when the so-formed hydroxyl-terminated polymer was destined for use in urethane formation (such as in the preparation of block resins), as the presence of an acidic material may retard urethane formation.

HTBNs so formed in accordance with the process of the present invention, as well as HTBNs generally, have many uses, though a particularly desirable one is as intermediate monomers in the formation of block prepolymer resins. Block prepolymer resins may be viewed as one-component, polymerizable block co-polymers having rigid and flexible segments, with block resins having flexible segments derived from HTBN being particularly useful in the preparation of structural anaerobic adhesives. Products derived from such resins are ordinarily characterized by a combination of high adhesive strength, good cure through depth (surface activation) and outstanding cohesive toughness. See the '909 patent.

Thus, an additional aspect of this invention provides an adhesive and sealant composition having improved thermal and impact properties and curable though gaps of more than 40 mils.

Such a composition includes a reaction product of the hydroxyl-functionalized material formed from reacting a carboxylic acid-functionalized material with an hydroxyalkylating reagent in the presence of a phase transfer catalyst under conditions sufficient to form the hydroxyl-functionalized material; a molar excess of polyisocyanate and polyol, with the so-formed reaction product subsequently being reacted with a molar excess of a hydroxyalkyl or amino acrylate, or methacrylate; and an initiator.

Of course, the carboxylic acid-functionalized material may be one within the structure below:

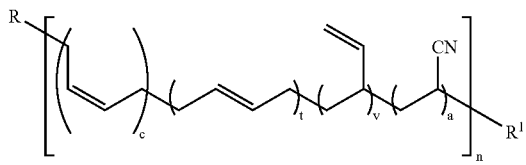

where R and $R^1$ may be the same or different and may be selected from COOH or $CAA^1$—X—COOH, with A and $A^1$ being the same or different and being selected from hydrogen, halogen, cyano or linear or branched alkyl groups having from 1 to about 5 carbon atoms and X being selected from linear or branched alkyl groups having from 2 to about 5 carbon atoms, c+t+v+a=1, and n is an integer in the range of from about 5 to about 750.

The hydroxylating reagent may be selected from carboxylic carbonates and carbocyclic sulfites. The polyisocyanate and the polyol may be ones which are aromatic or cycloaliphatic. The initiator may be a free-radical initiator or a photoinitiator.

A desirable adhesive and sealant composition along these lines includes one where the polyisocyanate is toluene diisocyanate or 4,4'-diisocyanate diphenyl methane and the reaction product is one from the reaction of isocyanate-terminated hydrogenated bisphenol-A with toluene diisocyanate.

Accordingly, HTBNs formed in accordance with the present invention may be used to form block prepolymer resins in accordance with the teaching of the '909 patent, such as by chemically-linking two "pre-polymers" which are subsequently "capped" with acrylate or methacrylate functionality. In this way, a "flexible" polymeric butadiene polyol segment of relatively low molecular weight is reacted with a molar excess of a "rigid" diisocyanate, such as toluene diisocyanate or methylene diisocyanate, thereby forming urethane linkages. Thus, the resin structures include a central flexible low glass transition linear polymer which is chemically linked to relatively short rigid segments, located at either end of the linear polymer through urethane groups and capped with acrylate or methacrylate groups.

The term "rigid" segment as used herein with respect to block resins includes a segment or segments containing aromatic, heterocyclic or cycloaliphatic rings, with multiple segments joined by either fusing the rings or by a minimum number of carbon atoms (e.g., 1 to 2, if linear, or 1 to about 6, if branched) such that there is little or no flexing of the segments. The term "flexible" segment as used herein with respect to block resins includes a segment of primarily linear aliphatic moieties containing internal unsaturation, with pendant functional groups, such as aromatic, heterocyclic, cycloaliphatic, and the like, as well as branching, also incorporated therein, provided no substantial interference exists with the flexible nature of the linear portion.

The flexible polybutadiene or copolybutadiene having functional groups containing an active hydrogen may be reacted with a molar excess (e.g., about 0.05 to about 6) of polyisocyanate as to the concentration of the active hydrogen-containing groups on the polybutadiene. In this way, a product is assured which has an isocyanate group at each end of the polybutadiene segment.

The rigid segment may be derived from the reaction of cycloaliphatic diols, such as hydrogenated bis-phenol A, with two equivalents of a diisocyanate, such as toluene diisocyanate. The urethane resins are synthesized in the presence of diluent monomers, such as triethylene glycol dimethacrylate, which also have a significant influence on the cured material properties. Such block resins derived from HTBN have improved thermal, chemical and impact resistance compared to other materials.

By selection of appropriate flexible and rigid segments, the material properties of the cured resins may be optimized for adhesive applications. And in order to ensure rapid and complete incorporation of the flexible segment into the urethane polymer, it is desirable for the terminal hydroxyl groups of the HTBN to be primary, rather than secondary or tertiary.

Block resins may be prepared at temperatures within the range of from about room temperature to about 150° C., with temperatures within the range of from about 40° C. to about 120° C. being particularly desirable. After addition of the flexible diol to the isocyanate-functionalized rigid segment, the reaction should be allowed to continue to proceed for a period of time of about 0.1 to about 24 hours. In addition, if desired, the reaction may be catalyzed, and unreactive diluents may also be used to control viscosity, bearing in mind of course that the presence of unreactive diluents may affect material properties of the cured resins.

The product of this reaction may be reacted with at least a molar equivalence, based on isocyanate group content, of an hydroxy or aminoalkyl acrylate or methacrylate to form an adhesive/sealant monomer (or prepolymer) capped at both ends with acrylate or methacrylate functionality, respectively. Esters suitable for such use are of a wide variety, although particularly desirable ones may be represented by:

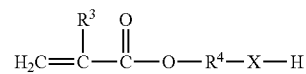

where X is O, S or NH, $R^3$ may be hydrogen, halides (e.g., chlorine) and alkyl groups (e.g., methyl and ethyl); and $R^4$ may be lower alkyl groups, such as linear, branched, or cyclic groups having 1 to about 8 carbon atoms, phenylene and naphthalene.

The fully-prepared monomeric block prepolymers may be represented by:

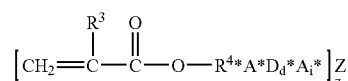

where $R^3$ and $R^4$ are as defined above; A is a polyisocyanate linkage; D is an aromatic, heterocyclic or cycloaliphatic polyol or polyamine group (e.g., a diol of a cycloaliphatic compound); Z is a polymeric or copolymeric polyol or poly radical of butadiene, the latter having a degree of polymerization of from about 5 to about 150 and at least about 70 percent of the polybutadiene portion of the 1,4-configuration; z is an integer corresponding to the valency of Z; d is either 0 or 1; and i is 0 when d is 0, and otherwise is one less than the number of reactive hydrogen atoms of D. An asterisk indicates a urethane (—NH—COO—) or ureide (—NH—CO—NH—) linkage.

As noted above, the block prepolymer resins cure to a hard, tough resin, using any of a wide variety of known free radical initiators, which may be activated by redox, thermal or photo-initiated mechanisms.

Examples of such free radical initiators include (a) ones which perform through a redox mechanism such as benzoyl peroxide/N,N-dimethyl-p-toluidine, cumene hydroperoxide/o-benzoyl sulfimide/N,N-dimethyl-p-toluidine, and tributyl borane; (b) ones which perform under elevated temperature conditions such as benzoyl peroxide, and 2,2'-azobisisobutylnirtile; and (c) ones which perform through photo-initiators 2,2-dimethoxy-2-phenylacetophenone and benzoyl cyclohexanol.

In addition, while one aspect of the present invention as exemplified in the illustrative examples is directed to a novel process for the preparation of HTBN, as noted above, it may also be used to convert a wide range of carboxylic acid functionalized polymers and oligomers to the corresponding hydroxylated derivatives.

The following examples are provided only for illustrative purposes and are not to be construed in any way to limit the teaching hereof.

EXAMPLES

Synthesis of HTBN

Examples describing the synthesis of HTBN by the process of the present invention and the physical properties of the so-formed HTBN are presented below, with a comparison of the physical properties of the commercial HTBN, "HYCAR" 1300X29.

The CTBN used was "HYCAR" 1300X31, commercially available from B.F. Goodrich, which contains about 10% by weight of acrylonitrile, has a nominal end functionality of about 1.9 and a number average molecular weight ($M_n$) of about 3,800 (as determined by vapor pressure osmometry).

Example 1

To a 3-necked, 1 liter reaction flask equipped with a mechanical stirrer, thermocouple and addition funnel was introduced with stirring about 302.48 grams (about 0.08 moles) of CTBN. The CTBN was heated to a temperature of about 125° C., at which temperature about 9.23 grams (about 0.33 moles) of ethylene carbonate and about 6.98 grams (about 0.027 moles) of tetraethylammonium iodide were introduced. The temperature of the reaction mixture was then increased to about 135° C. After a period of time of about 5 minutes, the mixture was observed to darken and began to foam. Stirring and heating were continued for an additional period of time of about 55 minutes, while maintaining the reaction temperature within the range of about 125 to about 135° C. The contents of the vessel were then cooled to a temperature of about 50° C. and poured, with vigorous stirring, into a vessel containing about 1 liter of methanol, at room temperature.

On standing, the crude reaction product settled to the bottom of the vessel and the methanol was decanted. The product was then washed twice with 500 ml portions of methanol, with the methanol removed by decanting after each washing. The product was then placed in a crystallizing dish and heated to a temperature of about 80° C. under a vacuum and maintained under such conditions for a period of time of about 11 hours. After such time, about 250 grams of HTBN was recovered corresponding to a yield of about 83%.

The structure of the HTBN product was confirmed by spectral analyses as follows: $^1$H NMR (CDCl$_3$): $\delta$=3.83, m, 2H and $\delta$=4.23, m, 2H; terminal methylene group protons —C(O)OCH$_2$CH$_2$OH; IR (KBr film): 3512 cm$^{-1}$ (—OH); 2250 cm$^{-1}$ (—CN); 1745 cm$^{-1}$ (carbonyl group of ester).

In addition, the $^1$H NMR spectrum of the HTBN product showed neither the starting reagents, ethylene carbonate and phase transfer catalyst, nor ethylene glycol, a potential hydrolysis by-product. Residual methanol from the purification step was also shown to have been removed. The spectral characteristics of the HTBN product obtained by this method were observed to be similar to those obtained from the "HYCAR" 1300X29 HTBN product.

Example 2

To a 3-necked, 500 ml reaction flask equipped with a mechanical stirrer, thermocouple and addition funnel was introduced with stirring about 159.22 grams (about 0.04 moles) of CTBN. In this case, the stirred CTBN was heated to a temperature of only about 80° C., at which temperature about 15.41 grams (about 0.18 moles) of ethylene carbonate was introduced. The temperature of the reaction mixture was then increased to about 140° C. and thereafter about 3.68 grams (about 0.014 moles) of tetraethylammonium iodide was introduced. Almost immediately, gas bubbles were observed to form in the bulk mixture. Stirring and heating were continued for a period of time of about 45 minutes, while maintaining the reaction temperature within the range of about 140 to about 143° C. The contents of the flask were then cooled and about 500 ml of dichloromethane was introduced. The polymer solution so formed was transferred to a separator funnel and washed twice with about 500 ml portions of water. The organic layer was separated, dried over anhydrous sodium sulfate and then filtered.

The solution was then transferred to an evaporating dish and warmed to a temperature of about 45° C. to remove most of the methylene chloride, and then heated to a temperature of about 60° C. under vacuum for a period of time of about 8 hours to yield about 140.89 grams of HTBN corresponding to an about 89% recovery. The warm polymer was then transferred to a distillation flask and heated on a rotary evaporator at a temperature of about 95° C. for a period of time of about 3.5 hours under reduced pressure. The product obtained was found by NMR and IR analyses to be identical to the product described in Example 1.

Example 3

Example 1 supra was repeated using about equimolar amounts of CTBN and ethylene carbonate, the progress of which was monitored by NMR analysis (through the emergence of signals at $\delta$=3.85 and $\delta$=4.23) with a sampling frequency of about 0.5 hours. HTBN product was not detected until the reaction mixture had been heated for a period of time of about 1.5 hours. In contrast, when that reaction was performed with an about 2-fold molar excess of ethylene carbonate, substantially complete conversion of CTBN to HTBN was observed after a period of time of about 1 hour. This indicates that the reaction rate is significantly enhanced by employing excess ethylene carbonate.

Example 4

Example 1 supra was repeated with the temperature of the mixture being maintained in the range of about 100 to about 107° C. throughout the heating period. NMR analysis indicated that no HTBN product had formed after a period of time of about 1 hour.

Example 5

Example 1 supra was again repeated with the temperature of the mixture being maintained in the range of about 155 to about 160° C. throughout the heating period. $^1$H NMR analysis indicated that the degree of hydroxyalkylation decreased from substantial completion to about 70% after a period of time of about 1.5 hours.

Example 6

To a 3-necked, 250 ml reaction flask, equipped with a mechanical stirrer, thermocouple temperature controller and addition funnel was added about 111.82 grams (about 0.029 moles) of "HYCAR" CTBN 1300X21. The stirred polymer was heated to a temperature of about 100° C., at which temperature about 9.84 grams (about 0.11 moles) of ethylene carbonate and about 0.608 grams of p-toluenesulfonic acid were added. The temperature of the mixture was increased over the course of about 5 minutes and when the temperature reached about 120° C. the mixture darkened in color and began to foam. The temperature of the reaction mixture was allowed to increase thereafter to about 132° C. over the course of about 15 minutes. Stirring and heating were continued for an additional period of time of about 0.5 hours while maintaining the reaction temperature between about 132 and 137° C. $^1$H NMR analysis indicated that HTBN product was not present in the crude reaction mixture after that time.

Example 7

To a 3-necked, 5 liter resin kettle equipped with a mechanical stirrer and thermocouple was added about 1570 grams (about 0.39 moles) and "HYCAR" 1300X31 CTBN. The stirred polymer was heated to a temperature of about 115° C., at which temperature about 152 grams (about 1.7 moles) of ethylene carbonate and about 36 grams (about 0.14 moles) of tetraethylammonium iodide as a phase transfer catalyst were added. The mixture was observed to darken in color and thereafter begin to foam.

The temperature of the mixture was increased to about 135° C., with continued stirring and heating for a total period of time of about one hour while maintaining the reaction temperature in the range of about 134 to about 136° C. The contents of the kettle were cooled to a temperature of about 70° C. and about 47.2 grams of magnesium silicate ("MAGNESOL" Polysorb 30/40) were added, with stirring continued for a period of time of about 3 hours. After such time, about 15.8 grams of the filtration aid "CELITE" 503 were added, with stirring for another 15 minutes then filtered at a pressure of about 41 psi and a temperature of about 66° C. through a filter having a pore size of 25µ. $^1$H NMR spectrum of the filtered material showed that catalyst was absent. Ethylene carbonate was removed by wiped-film evaporation under reduced pressure to yield HTBN, having spectral characteristics similar to the product prepared in Example 1. Analyses showed the material to have an hydroxyl number of 23 and a carboxyl number of less than about 0.1.

Example 8

To a 3-necked, 5 liter resin kettle equipped with a mechanical stirrer, thermocouple and addition funnel was added with stirring about 1,604.11 grams (about 0.42 moles) of "HYCAR" CTBN 1300X31. The stirred polymer was heated to a temperature of about 110° C., at which temperature about 155.28 grams (about 1.76 moles) of ethylene carbonate and about 37.15 grams (0.14 moles) of tetraethylammonium iodide as the phase transfer catalyst were added. The temperature of the mixture was increased to about 126° C., and stirring and heating were continued for an additional period of time of about 175 minutes while maintaining the reaction temperature in the range of about 121 to about 128° C.

The contents of the reactor were cooled to about 60° C. and about 49 grams of magnesium silicate ("MAGNASOL" Polysorb 30/40) was added. The mixture was stirred for a period of time of about 4 hours and centrifuged for a period of time of about 10 minutes at a rate of about 2,500 rpm to separate the silicate. $^1$H NMR analysis indicated that substantially all of the phase transfer catalyst was removed as indicated by the disappearance of the characteristic methylene proton signal at δ=3.48.

A small aliquot (about 2 grams) of the centrifuged material was heated to a temperature of about 80° C. under vacuum for a period of time of about 7 hours to provide HTBN, substantially free of ethylene carbonate, having the spectral characteristics of the HTBN product prepared in accordance with Example 1.

Example 9

Carboxylic acid-functionalized materials other then HTBN were treated with hydroxyalkylating agents in accordance with the process of the present invention to yield corresponding hydroxyl-functionalized materials.

For instance, we treated trans-3-hexenoic acid (a low molar mass model compound for HTBN) with ethylene carbonate in the presence of a phase transfer catalyst to yield 2-hydroxyethyl-3-hexenoate. More specifically, trans-3-hexenoic acid (about 1.14 grams; about 0.001 moles, commercially available from Aldrich Chemical Co., Milwaukee, Wis.), ethylene carbonate (about 0.97 grams; about 0.001 moles) and phase transfer catalyst were added to a 25 ml reaction flask containing a magnetic stirrer. The mixture was stirred at elevated temperature conditions to effect the hydroxyethylation reaction of the hexenoic acid. The reaction yields were estimated from the $^1$H NMR spectrum of the crude product mixture.

The results obtained for a variety of parameter variations (such as, identity and quantity of phase transfer catalyst, time and temperature of the reaction, and the like) are presented below in Table 1.

TABLE 1

| Catalyst | Equivalents conc. | Temp. (° C.) | Time (hours) | Yield (%) |
|---|---|---|---|---|
| none | — | 150 | 2 | 0 |
| Potassium carbonate | 0.35 | 150 | 2 | 0 |
| Tetrabutyl ammonium bromide | 0.05 | 135 | 5 | 61 |
| Tetrabutyl ammonium bromide | 0.1 | 130 | 3 | 76 |

TABLE 1-continued

| Catalyst | Equivalents conc. | Temp. (° C.) | Time (hours) | Yield (%) |
|---|---|---|---|---|
| Tetrabutyl ammonium bromide | 0.2 | 140 | 1 | 92 |
| Tetrabutyl ammonium bromide | 0.1 | 135 | 10 | 0 |
| Tetraethyl ammonium iodide | 0.2 | 140 | 0.33 | 51 |
| Tetraethyl ammonium iodide | 0.2 | 140 | 0.66 | 63 |
| Tetraethyl ammonium iodide | 0.2 | 140 | 1 | 77 |

Example 10

Evaluation of HTBN

Molecular Weight Determination

Initially, we measured the molecular weight of the HTBN formed in Examples 1 and 2 supra using size exclusion chromatography employing a high pressure liquid chromatography system [Styragel HR 5μ column set (commercially available from Waters, Incorporated), with pore sizes $10^6$, $10^4$ and 500 Å], equipped with a differential refractometer. The system was calibrated with conventional polystyrene standards. Tetrahydrofuran was used as a mobile phase at a flow rate of about 1 ml/min.

We examined refractometer measurements of the eluted fractions and determined the molecular weight to be about 10,100 for the commercial HTBN compared to about 10,400 and about 11,300 for the HTBN products derived from ethylene carbonate in Examples 1 and 2, respectively. Molecular weight distributions were found to be about 1.8 for each material. Thus, good agreement was found in this regard between the HTBN prepared by the process of the present invention and the commercial HTBN.

Hydroxyl Number

We also determined the hydroxyl number for HTBN prepared by the process of the present invention and its commercial counterpart. The hydroxyl number is a measure of the concentration of hydroxyl groups on the polymeric structure and is desirable to ensure that the stoichiometric equivalent of diisocyanate be employed in the production of the block-prepolymer intermediate. Hydroxyl numbers were determined here by standard titration techniques and are reported here as mg of KOH/g of polymer.

We found the commercial HTBN to possess an hydroxyl number of 22.7 and the HTBN prepared from ethylene carbonate in Examples 1 and 2 supra to possess an hydroxyl number of 22.2 and 21.4.

Acid Numbers

The acid number is the amount of free carboxylic acid and is used to determine residual unreacted carboxylic acid at the completion of the reaction. It is desirable for the HTBN to have a low acid number, particularly when the HTBN is to be used to prepare urethane resins, because acid functionalized polymers (e.g., CTBN) react only slowly and incompletely with isocyanates. We found the process of the present invention to provide materials essentially free of carboxylic acid functionality, which compares favorably with values obtained from commercial HTBN.

In order to determine the acid number of the HTBN, we used standard titration techniques and reported the acid values as mg of KOH/g of polymer. The HTBN prepared by the process of the present invention exhibited an acid number of less than 0.1, whereas the commercial HTBN exhibited an acid number of about 2.6. Thus, it is seen that with respect to acid conversion, the process of the present invention provides greater than a twenty fold decrease in residual acid, which results in a cleaner urethane product and is desirable to ensure that the stoichiometric equivalent of diisocyanate be employed in the production of the block-prepolymer intermediate.

Presence of Residual Glycol $^1$H NMR analysis of commercial HTBN showed the presence of ethylene glycol in an amount in the range of about 0.29 to about 0.43 by weight percent. The presence of ethylene glycol in HTBN prepared from CTBN and excess ethylene oxide is not entirely surprising as residual ethylene oxide may be converted to ethylene glycol by hydrolysis. However, the presence of ethylene glycol in the HTBN is disadvantageous for certain applications to the extent that it reduces the toughness of block resins derived from HTBN. While this attribute may be beneficial in certain applications, in other applications where enhanced stiffness or reactivity is required, it is desirable to have the choice of whether or not a less tough material is to be formed. That is, in the event that a less tough HTBN-derived block resin is desirable for certain applications, ethylene glycol could nevertheless be added to the HTBN. With the process of the present invention, no ethylene glycol is produced and thus a tougher HTBN-derived block resin is afforded.

Miscellaneous

Of course, since the process of the present invention does not call for a trialkyl amine coreactant, residual amine is ordinarily zero or at most minimal. Again, we used standard titation techniques to determine the presence of amine, which is reported as mg of KOH/g of polymer. The amine value for commercial HTBN was determined to be about 1.19, whereas the amine value for an HTBN prepared according to the present invention was determined to be about 0.19. It is desirable to have a low amine value because amines contribute to variable reactivity and product instability during the preparation of the block-prepolymers.

Synthesis of Block Resins

We prepared block resins in accordance with the teaching of the '909 patent from both HTBN prepared using the process of the present invention and commercially available HTBN, and thereafter evaluated the properties and characteristics of the resulting block resins. Those results are described below.

Example 11

Block resins were prepared from HTBN prepared by the process of the present invention as follows.

To a 3-necked, 500 ml reaction flask equipped with a mechanical stirrer, thermocouple and condenser/inlet port was introduced with stirring about 7 grams (about 0.029 moles) of hydrogenated bisphenol-A ("HBPA"), about 48.06 grams (about 0.168 moles) of triethyleneglycol dimethacrylate, about 0.27 grams (about 0.72 mmoles) of dibutyltin dilaurate, 0.04 grams (about 0.37 mmoles) of benzoquinone and about 0.96 grams (about 0.01 moles) of methacrylic acid.

The mixture was heated to a temperature of about 70° C. under a nitrogen atmosphere for a period of about 0.5 hours, and about 10.17 grams (about 0.058 moles) of toluene diisocyanate ("TDI") (80% 2,4- and 20% 2,6 isomers) was introduced dropwise over a period of time of about 2 minutes. Thereafter, a reaction exotherm was observed, during which the temperature increased to about 83° C. and the mixture was observed to clarify. Heating and stirring were continued for a further period of time of about 1 hour, after which time about 56.34 grams (about 0.015 moles) of HTBN, prepared as described above in Example 1 supra, was introduced. Heating and stirring were continued for a further period of time of about 2 hours, at which time about 2.98 grams (about 0.028 moles) of 2-hydroxyethyl methacrylate ("HEMA") and about 0.14 grams (about 0.37 mmoles) of dibutyltin dilaurate were introduced. Heating and stirring were continued for an additional period of time of about 6 hours, after which time an IR spectrum of the reaction mixture indicated that all of the isocyanate was consumed (through the disappearance of the absorption band of the isocyanate at 2265 $cm^{-1}$).

The reaction mixture was cooled and spectral and chromatographic analysis confirmed the cooled product to be a methacrylate-terminated urethane block co-polymer having a flexible HTBN derived center segment and rigid urethane end segments similar to the product described in Example 1 of the '909 patent, having the following structure:

HEMA - - TDI - - HBPA - - TDI - - HTBN - - TDI - - HBPA - - TDI - - HEMA where each urethane group is indicated by the dashed line ( - - ). This block resin is referred to hereinafter as Resin A. Size exclusion chromatography as described supra showed Resin A to have a number average molecular weight of about 19,500

Example 12

For comparative purposes, block resins were prepared from commercially available "HYCAR" 1300X29 HTBN. Since the "HYCAR" HTBN polymer contains a significant concentration of ethylene glycol, block resins prepared with that HTBN can be expected to contain, in addition to the resin above, a short rigid block derived from an ethylene glycol ("EG") center segment, having the following structure:

HEMA - - TDI - - HBPA - - TDI - - EG - - TDI - - HBPA - - TDI - - HEMA

The difference in structure representation is seen to be due to the similarity in reactivity of isocyanate with either Resin A and the block resin whose structure is depicted above (referred to hereinafter as Resin B).

With respect to the production of block resins through an isocyanate/polyol addition, while the presence of ethylene glycol may be advantageous for certain applications it is disadvantageous for the purpose of preparing toughened block resins. In this regard, ethylene glycol has substantially equivalent reactivity to the HTBN resin and results in the formation of a short, and hence rigid, urethane oligomer which in turn results in adhesive products with reduced toughness. Further, if the concentration of the ethylene glycol varies, then adhesive products with variable rheological and mechanical properties will be produced. Such variations is often viewed as unacceptable.

Example 13

Evaluation of Properties of Block Resins

Molecular Weight Determination

We measured the molecular weight of the block resins as so prepared in this example using size exclusion chromatography and the protocol set forth above with respect to the HTBN materials. The number average molecular weight of Resin A was determined to be about 19,500. In contrast, the number average molecular weight of Resin B was determined to be about 18,000.

As the molecular weight of the EG prepolymer is significantly lower than that of the HTBN material, it is to be expected that the molecular weight of a blend of the EG and HTBN products will be lower than that of the HTBN formed in accordance with this invention, such as the HTBN used to prepare Resin A.

Thus, block resins prepared from the HTBN formed in accordance with the process of this invention (i.e., Resin A) demonstrated a higher number average molecular weight due, in part, to lower levels of short blocks derived from ethylene glycol, which are present in Resin B. This difference may provide further opportunities for block resins prepared from HTBN formed in accordance with this invention, such as where improved thoughness and elongation are desirable properties to extend the range of applications for adhesives, protective coatings and sealant compositions.

Example 14

Curing of Block Resins

We cured the block resins prepared as described in Examples 11 and 12 supra by dissolving therein about 1% by weight of the UV/visible photoinitiator "IRGACURE" 1700 [the combination of about 25% bis-(2,6-dimethoxybenzoyl)-2,4-, 4-trimethylpentyl phosphine oxide and about 75% 2-hydroxy-2-methyl-1-phenyl-propan-1-one, commercially available from Ciba-Geigy Corporation, Tarrytown, N.Y.].

Each of the photoinitiator-containing block resins was applied between glass/polyester plates and cured by exposure to ultraviolet light, emitted from a Fusion Systems conveyer assembly equipped with a "D" bulb and reflectors, at a fluence of 1 $J/cm^2$/side. The resins cured to a film having a thickness of about 0.5 mm.

Example 15

Evaluation of Properties of Cured Block Resins

We evaluated the physical properties and characteristics of the resulting reaction product of the cured block resins, a summary of which is provided below.

The mechanical properties of the cured films were determined from (1) stress-strain measurements using an Instron universal tensile tester operating at a strain rate of about 0.2"/min., with a film size of about 101.6×6.35 $mm^2$ and (2) dynamic mechanical analysis ("DMA") using a Rheometrics Analyzer II in oscillatory shear strain operating at a frequency of about 10 radians/sec., with a film size of about 25×12 mm². The results are presented below in Table 2:

TABLE 2

| PHYSICAL PROPERTY | CURED RESIN A | CURED RESIN B |
|---|---|---|
| MODULUS (PSI) | 54,260 | 56,780 |
| STRESS AT BREAK (PSI) | 2,561 | 2,527 |
| STRAIN AT BREAK (PSI) | 63 | 39 |
| TOUGHNESS (in.lbs./cm³) | 1,206 | 790 |
| $T_g1$ (° C.) | −55.5 | −55.7 |
| tanδ1 | 0.12 | 0.11 |
| $T_g2$ (° C.) | 93 | 112 |
| tanδ2 | 0.24 | 0.20 |

The tabulated results show that the two cured block resins have similar stiffness and breaking strength. However, the elongation at break and toughness of cured Resin A are superior to that of cured Resin B.

More specifically, both cured resins show two distinct transitions in the DMA spectrum, a low temperature transition, designated $T_g1$, and a high temperature transition, designated $T_g2$. The two transitions are indicative of a two-phase morphology. The similarity of the DMA parameters ($T_g$, tan values) indicates a similar structure for the cured resins. The low temperature transition (at about −55° C.) occurs at about the same temperature for both of the cured resins and is associated with the rubbery central segment derived from HTBN. The high temperature transition (at about +100° C.) is associated with the stiffer urethane end segments and is lower for cured Resin A than for cured Resin B. The lower $T_g2$ value for cured Resin A may be attributed to the absence of ethylene glycol in the HTBN prepared by the process of the present invention (and hence the absence of the corresponding rigid short chain urethane oligomer present in Resin B). This result correlates well with the increased toughness associated with cured Resin A.

¹H NMR analysis indicated the presence of ethylene glycol (about 0.5% by weight, about 24 mole percent) in the HTBN prepared in accordance with the '691 patent, or commercial HTBN. While minor in terms of weight inclusion, the presence of ethylene glycol represents a significant concentration in molar terms, to the large disparity in molecular weight between ethylene glycol and HTBN. If the hydroxyl number determined for the commercial HTBN polymer is adjusted by subtracting the estimated contribution due to ethylene glycol, the hydroxyl value attributable to the HTBN is reduced from 25.3 to 19.5. Thus, the hydroxyl number for HTBN prepared in accordance with this invention is at least comparable, if not slightly higher, than that of the commercial HTBN. Ethylene glycol was not detected in the HTBN prepared in accordance with this invention.

Amine analysis also indicated the presence of residual amine in the commercial HTBN product. This amine impurity is known to cause premature polymerization and formation of urethane/isocyanate by-products, particularly when (meth)acrylate capping reagents and diluents are employed with respect to the production of urethane prepolymers. Accordingly, it is desirable and advantageous to first remove or neutralize the amine catalyst, prior to the introduction of isocyanate monomers.

The HTBN prepared in accordance with this invention is also substantially free of carboxylic acid functionalized materials. Carboxylic acids are undesirable, since they are known to compete with hydroxyl groups for isocyanate and result in the formation of complex mixtures of ureas, anhydrides, amides and carbon dioxide.

The scope of the present invention may be gleaned from the claims.

What is claimed is:

1. A process for preparing a dihydroxyl-functionalized material by hydroxyalkylating a dicarboxylic acid-functionalized material, said process comprising the step of: reacting as reactants: (a) a dicarboxylic acid-functionalized material selected from the group consisting of dicarboxylic acid-functionalized polymers of: polybutadiene, poly(butadiene-co-acrylonitrile), poly(acrylonitrile) and combinations thereof; and (b) a hydroxyalkylating reagent selected from the group consisting of: a carbocyclic carbonate, a carbocyclic sulfite and combinations thereof; in the presence of: (c) a phase transfer catalyst under conditions sufficient to form a dihydroxyl-functionalized material;

wherein said dihydroxyl-functionalized material has a molecular weight that is substantially unchanged relative to the molecular weight of said dicarboxylic acid-functionalized starting material.

2. The process according to claim 1, wherein said dicarboxylic acid-functionalized material has carboxyl-functional groups independently selected from the group consisting of: R and R¹, wherein each R and R¹ is independently selected from the group consisting of: COOH or CAA¹—X—COOH, wherein each A and A¹ is independently selected from the group consisting of: hydrogen, halogen, cyano, linear or branched alkyl having from 1 to about 5 carbon atoms and wherein X is a linear or branched alkyl having from 1 to about 5 carbon atoms.

3. The process according to claim 1, wherein said dicarboxylic acid-functionalized material has a number average molecular weight of from about 3,100 to about 4,200.

4. The process according to claim 1, wherein said hydroxyalkylating reactant is a member selected from the group consisting of carbocyclic carbonate and carbocyclic sulfites.

5. The process according to claim 4, wherein said carbocyclic carbonate is a member selected from the group consisting of ethylene carbonate, 1,3-propylene carbonate, 2-methyl-1,2-ethylene carbonate, 3-methyl-1,3-propylene carbonate, 1,2-dimethyl ethylene carbonate, 2,2-dimethyl butylene carbonate and combinations thereof.

6. The process according to claim 4, wherein said carbocyclic carbonate is ethylene carbonate.

7. The process according to claim 4, wherein said carbocyclic sulfite is a member selected from the group consisting of ethylene sulfite, propylene sulfites and combinations thereof.

8. The process according to claim 4, wherein said carbocyclic sulfite is ethylene sulfite.

9. The process according to claim 1, wherein said dihydroxyl-functionalized material is selected from the group consisting of the dihydroxyl-functionalized polymers of: polybutadiene, poly(butadiene-co-acrylonitrile), polyacrylonitrile, and combinations thereof.

10. The process according to claim 1, further comprising the step of providing an amphoteric treating agent in an amount sufficient to cause said dihydroxyl-functionalized material to separate from the reactants which remain and/or any by-products thereof.

11. The process according to claim 10, wherein said amphoteric treating agent is a member selected from the group consisting of silicated magnesium oxide, magnesium oxide, magnesium hydroxide, calcium hydroxide, barium hydroxide and combinations thereof.

12. The process according to claim 1, wherein said phase transfer catalyst is a member selected from the group consisting of quaternary ammonium halides, phosphonium halides, sulfonium halides, crown ethers, calixarenes and combinations thereof.

13. The process according to claim 1, wherein said phase transfer catalyst is a member selected from the group consisting of tetrabutyl ammonium iodide, tetraethylammonium iodide, benzyl trimethyl ammonium chloride and ethyl triphenylphosphonium bromide.

14. The process according to claim 1, wherein the molar ratio of said hydroxyalkylating reagent to said dicarboxylic acid-functionalized material is from about 3.8 to about 4.5.

15. The process according to claim 1, wherein said carboxylic acid-functionalize material is a member selected from the group consisting of carboxylic acid-functionalized polybutadiene and carboxylic acid-functionalized poly(butadiene-co-acrylonitrile).

* * * * *